(12) United States Patent
Machino

(10) Patent No.: US 8,649,971 B2
(45) Date of Patent: Feb. 11, 2014

(54) NAVIGATION DEVICE

(75) Inventor: Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 530 days.

(21) Appl. No.: 12/918,992

(22) PCT Filed: Jan. 14, 2009

(86) PCT No.: PCT/JP2009/000108
§ 371 (c)(1),
(2), (4) Date: Aug. 23, 2010

(87) PCT Pub. No.: WO2009/122633
PCT Pub. Date: Oct. 8, 2009

(65) Prior Publication Data
US 2011/0035148 A1 Feb. 10, 2011

(30) Foreign Application Priority Data
Apr. 2, 2008 (JP) ................................. 2008-096213

(51) Int. Cl.
*G01C 21/00* (2006.01)
*G08G 1/123* (2006.01)

(52) U.S. Cl.
USPC ....................................... 701/411; 340/995.2

(58) Field of Classification Search
USPC ............. 701/400–541, 31.1, 32.4, FOR. 123, 701/32.5, 32.6; 340/988–996, 995.27, 427, 340/476, 644, 5.31, 7.55, 12.27; 455/418, 455/456.1; 342/176, 374
See application file for complete search history.

(56) References Cited

U.S. PATENT DOCUMENTS

| 5,793,631 | A | | 8/1998 | Ito et al. |
| 5,926,118 | A | * | 7/1999 | Hayashida et al. ...... 340/995.21 |
| 5,931,888 | A | | 8/1999 | Hiyokawa |
| 5,977,885 | A | | 11/1999 | Watanabe |
| 6,018,697 | A | * | 1/2000 | Morimoto et al. ............ 701/411 |
| 6,154,703 | A | | 11/2000 | Nakai et al. |
| 2004/0044464 | A1 | * | 3/2004 | Sugiura et al. ................ 701/200 |
| 2004/0210388 | A1 | | 10/2004 | Sugiura |
| 2006/0167621 | A1 | | 7/2006 | Dale |
| 2007/0106469 | A1 | * | 5/2007 | Ishizaki ........................ 701/211 |
| 2007/0143011 | A1 | | 6/2007 | Sato |

FOREIGN PATENT DOCUMENTS

| DE | 10295465 T5 | 11/2004 |
| DE | 102004017196 A1 | 12/2004 |
| EP | 0777206 A1 | 6/1997 |
| EP | 0833292 A1 | 4/1998 |
| JP | 5-296775 A | 11/1993 |

(Continued)

*Primary Examiner* — Muhammad Shafi
(74) *Attorney, Agent, or Firm* — Birch, Stewart, Kolasch & Birch, LLP

(57) ABSTRACT

A navigation device includes a route searching unit for searching for a whole route leading to a destination via waypoints set by a setting unit, a route guidance unit for carrying out route guidance according to the whole route, an output unit for outputting a message showing that a vehicle has deviated from a route leading to a first next waypoint toward which the vehicle has been heading when the route guidance unit determines that the vehicle has deviated from the route to a predetermined distance or more and is traveling along a route after the first next waypoint, and an input unit for inputting a command indicating whether or not to travel via the first next waypoint in response to the message outputted by the output unit.

19 Claims, 7 Drawing Sheets

(56) References Cited

FOREIGN PATENT DOCUMENTS

| | | | |
|---|---|---|---|
| JP | 5-313574 | A | 11/1993 |
| JP | 6-66587 | A | 3/1994 |
| JP | 8-94370 | A | 4/1996 |
| JP | 9-152352 | A | 6/1997 |
| JP | 9-325041 | A | 12/1997 |
| JP | 11-14393 | A | 1/1999 |
| JP | 2000-193478 | A | 7/2000 |
| JP | 2000-337910 | A | 12/2000 |
| JP | 2003-166834 | A | 6/2003 |
| JP | 2007-132735 | A | 5/2007 |

* cited by examiner

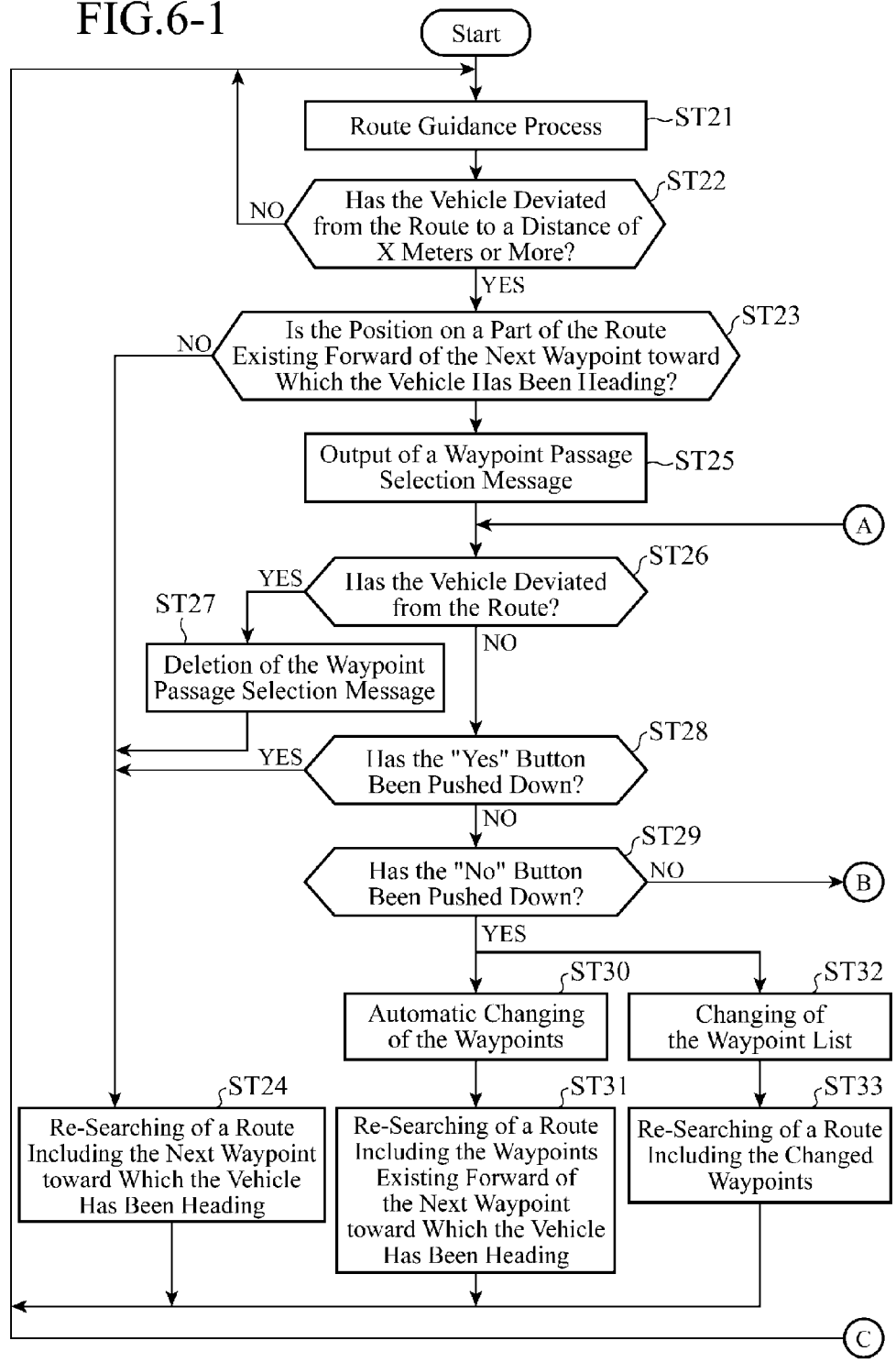

NAVIGATION DEVICE

FIELD OF THE INVENTION

The present invention relates to a navigation device that carries out route guidance of a route including waypoints acquired through a route search. More particularly, it relates to a technology of providing information suitable for users when a vehicle travels without passing via a waypoint on a route.

BACKGROUND OF THE INVENTION

A related art navigation device can set a plurality of waypoints in addition to a destination, and searches for a route leading to the destination via the plurality of waypoints. The related art navigation device then provides route guidance of the route acquired through the route search by using a display screen and voice until the vehicle reaches the destination. Accordingly, the user can head to the destination via the desired waypoints by traveling according to the route guidance.

By the way, there is a case in which while traveling along the route leading, via the plurality of waypoints, to the destination or a waypoint, the user has not passed a certain waypoint and is traveling along the route toward either another waypoint existing forward of the waypoint or the destination according to or against his or her own will. In this case, the navigation device automatically re-searches for a route returning to the waypoint via which the user has not passed or a route in which the waypoint via which the user has not passed is not set as a waypoint independently of the user's will, and then provides the route for the user as a new whole route.

As such a navigation device, patent reference 1 discloses a car navigation device that, when determining that the vehicle has entered a guide path, which the user has planned to enter after passing a waypoint, before the vehicle actually passes the waypoint, can prevent switching to guidance about the path which the user has planned to enter after passing the waypoint. After determining that the vehicle has deviated from a guidance path leading to a waypoint and then moves to another guidance path which the user has planned to enter after passing the waypoint, if the distance from the current position to the waypoint is longer than a predetermined amount (e.g., 1 km), this car navigation device determines that the vehicle has not passed the waypoint and sets a new whole route leading from the current position to the waypoint.
[Patent reference 1] JP,2003-166834,A A problem with the above-mentioned related art navigation device is that because the navigation device automatically re-searches for a route returning to a waypoint which the user has not passed or a route in which the waypoint which the user has not passed is not set as a waypoint against the user's own will, e.g., "desires to pass the waypoint" or "desires to certainly pass the waypoint", and then provides the new whole route for the user, the related art navigation device is inferior in user-friendliness.

The present invention is made in order to solve the above-mentioned problem, and it is therefore an object of the present invention to provide a navigation device superior in user-friendliness that enables a user to determine how to handle a waypoint on a route which the user has not passed according to the user's own will.

DESCRIPTION OF THE INVENTION

In order to solve the above-mentioned problem, there is provided a navigation device in accordance with the present invention including: a setting unit for setting waypoints and a destination; a route searching unit for searching for a whole route leading to the destination via the waypoints set by the setting unit; a route guidance unit for carrying out route guidance according to the whole route which is searched for by the route searching unit; an output unit for outputting a message showing that a vehicle has deviated from a route leading to a first next waypoint toward which the vehicle has been heading when the route guidance unit determines that the vehicle has deviated from the route to a predetermined distance or more and is traveling along a route after the first next waypoint; and an input unit for inputting a command indicating whether or not to travel via the first next waypoint in response to the message outputted by the output unit.

Because the navigation device in accordance with the present invention is configured in such a way as to, when the vehicle has deviated from the route leading to the first next waypoint to the predetermined distance or more and is traveling along a route after the first next waypoint, output a message showing that the vehicle has deviated from the route and provide a command indicating whether or not to travel via the first next waypoint in response to this message, the navigation device enables the user to determine how to handle whether to pass via the first next waypoint according to the user's own will when the vehicle has deviated from the route, and can provide enhanced user friendliness.

BRIEF DESCRIPTION OF THE FIGURES

FIG. 6-1 is a flow chart showing a route guidance process carried out by the navigation device in accordance with Embodiment 1 of the present invention;

FIG. 6-2 is a flow chart showing the route guidance process carried out by the navigation device in accordance with Embodiment 1 of the present invention.

PREFERRED EMBODIMENTS OF THE INVENTION

In order to explain the invention in greater detail, the preferred embodiments of the invention will be explained below with reference to the accompanying figures. Embodiment 1.

Figure 1:
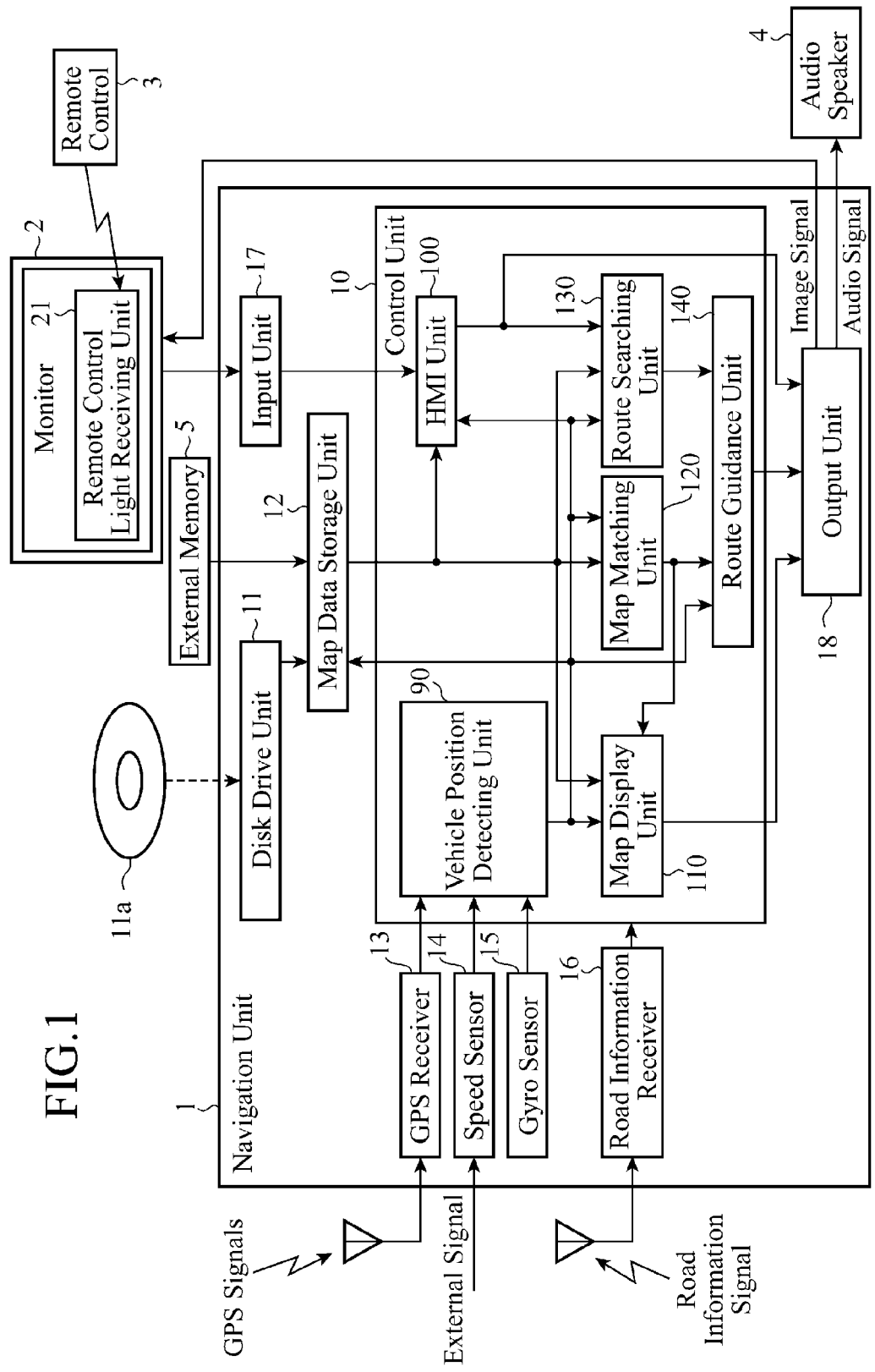
FIG. 1 is a block diagram showing the structure of a navigation device in accordance with Embodiment 1 of the present invention.

FIG. 1 is a block diagram showing the structure of a navigation device in accordance with Embodiment 1 of the present invention. This navigation device is comprised of a navigation unit 1, a monitor 2, a remote controller (abbreviated as a "remote control" from here on) 3, an audio speaker 4, and an external memory 5.

The navigation unit 1 forms the heart of this navigation device, and carries out processes including display of a map, a route search, display of a route, and route guidance. The details of this navigation unit 1 will be mentioned below.

The monitor 2 is comprised of, for example, an LCD (Liquid Crystal Display), and displays a map, a vehicle position mark, a whole route to a destination, a route guidance view, and other various messages according to an image signal sent thereto from the navigation unit 1. A remote control light receiving unit 21 is disposed in this monitor 2. The remote control light receiving unit 21 receives a light signal sent thereto from the remote control 3, and sends the light signal to the navigation unit 1 as an input signal via the monitor 2.

The remote control 3 is used in order for a user to scroll a map displayed on the monitor 2, input a waypoint and a destination, and respond to a message for urging the user to perform a certain operation. Instead of the remote control 3 or together with the remote control 3, a touch panel can be disposed. The touch panel is comprised of a touch sensor placed on the screen of the monitor 2, and the user is allowed to directly touch this touch sensor to input various pieces of information to the navigation device.

The audio speaker 4 outputs, by voice, a route guidance message according to a voice signal sent thereto from the navigation unit 1. The external memory 5 is optional and is comprised of, for example, a memory card or a USB memory. Map data similar to map data stored in a recording medium 11a inserted into a disk drive unit 11 which will be mentioned below are stored in this external memory 5. Use of this external memory 5 makes it possible to access the map data at a high speed, as well as to store a lot of map data.

Next, the details of the navigation unit 1 will be explained. The navigation unit 1 is comprised of a control unit 10, the disk drive unit 11, a map data storage unit 12, a GPS (Global Positioning System) receiver 13, a speed sensor 14, a gyro sensor 15, a road information receiver 16, an input unit 17, and an output unit 18.

The control unit 10 is comprised of, for example, a microcomputer, and controls the whole of the navigation unit 1. The details of this control unit 10 will be mentioned below.

The disk drive unit 11 reproduces the recorded contents of the recording medium 11a, such as a DVD (Digital Versatile Disc) or a CD (Compact Disc), in which map data are recorded when the recording medium 11a is inserted thereinto. The map data include map information, such as node information, road link information, and a lane marker. The map data reproduced by this disk drive unit 11 are sent to the map data storage unit 12.

The map data storage unit 12 temporarily stores the map data sent thereto from the disk drive unit 11 or the external memory 5. The map data stored in this map data storage unit 12 are referred to by the control unit 10. The map data storage unit 12 can be comprised of an HDD (Hard Disk Drive). In this case, the disk drive unit 11 and the external memory 5 become unnecessary.

The GPS receiver 13 detects the current position of the vehicle on the basis of GPS signals received, via an antenna, from GPS satellites. The current position of the vehicle detected by this GPS receiver 13 is informed to the control unit 10 as a current position signal.

The speed sensor 14 detects the speed of the vehicle on the basis of an external signal sent thereto from the vehicle in which this navigation device is mounted. The speed of the vehicle detected by this speed sensor 14 is informed to the control unit 10 as a speed signal.

The gyro sensor 15 detects the heading of the vehicle. The heading of the vehicle detected by this gyro sensor 15 is informed to the control unit 10 as a heading signal.

The road information receiver 16 receives a road information signal transmitted thereto from, for example, an external road traffic data communications system. The road information signal received by this road information receiver 16 is sent to the control unit 10. The control unit 10 creates a message showing the traffic congestion conditions of roads on the basis of the road information signal sent thereto from this road information receiver 16, and notifies the message to the user by outputting the message via the monitor 2 and the audio speaker 4.

The input unit 17 receives and analyzes an input signal sent thereto, via the remote control light receiving unit 21, from the remote control 3, and sends the result of this analysis to the control unit 10 as an operation command. A setting means and an input means in accordance with the present invention is comprised of buttons formed on the screen of the monitor 2, the remote control 3 for pointing one of these buttons, the remote control light receiving unit 21, and the input unit 17. As an alternative, the setting means and the input means can be comprised of a microphone and the input unit 17 provided with a voice recognition function of recognizing a voice signal sent from this microphone.

The output unit 18 creates an image signal on the basis of drawing data for drawing a map, which are sent from the control unit 10, drawing data for drawing the vehicle position mark and the route, and the operation command, and also creates an audio signal on the basis of audio data sent from the control unit 10. The image signal created by this output unit 18 is sent to the monitor 2. Furthermore, the audio signal created by the output unit 18 is sent to the audio speaker 4. An output means in accordance with the present invention is comprised of the output unit 18, the monitor 2, and the audio speaker 4.

Next, the details of the control unit 10 will be explained. The control unit 10 is comprised of, for example, a microcomputer, and controls the whole of this navigation unit 1. This control unit 10 is comprised of a vehicle position detecting unit 90, a human-machine interface (abbreviated as "HMI" from here on) unit 100, a map display unit 110, a map matching unit 120, a route searching unit 130, and a route guidance unit 140. These components can be comprised of an application program that operates under the control of the microcomputer.

The vehicle position detecting unit 90 detects the current position of the vehicle on the basis of the current position signal sent thereto from the GPS receiver 13, and also detects the current position of the vehicle through dead reckoning on the basis of both the speed signal sent thereto from the speed sensor 14, and the heading signal sent thereto from the gyro sensor 15. Because the vehicle position detecting unit can detect the current position of the vehicle through dead reckoning even if the GPS receiver 13 cannot receive GPS signals when, for example, the vehicle is travelling through a tunnel or the like, the navigation device can always detect the current position of the vehicle correctly. Current position data showing the current position of the vehicle detected by this vehicle position detecting unit 90 are sent to the HMI unit 100, the map display unit 110, the map matching unit 120, the route searching unit 130, and the route guidance unit 140.

The HMI unit 100 processes the operation command sent thereto from a not-shown operation panel or the input unit 17 with reference to both the map data sent thereto from the map data storage unit 12 and the current position data sent thereto from the vehicle position detecting unit 90. This HMI unit 100 carries out communications between the navigation device and the user. The data processed by the HMI unit 100 are sent to the route searching unit 130 and the output unit 18.

The map display unit 110 reads map data about an area surrounding the position shown by the current position data sent thereto from the vehicle position detecting unit 90 from the map data storage unit 12, and creates drawing data for displaying a map on the screen of the monitor 2 on the basis of these read map data. The drawing data created by this map display unit 110 are sent to the output unit 18.

The map matching unit 120 matches the vehicle position shown by the current position data sent thereto from the vehicle position detecting unit 90 to the map shown by the map data read from the map data storage unit 12 so as to form a vehicle position mark to be superimposed on the map. Data showing the vehicle position mark formed by the map matching unit 120 are sent to the route guidance unit 140.

The route searching unit 130 searches for an optimal whole route leading from the current position of the vehicle shown by the current position data sent thereto from the vehicle position detecting unit 90 to the destination (sent via the following path: the remote control 3 the remote control light receiving unit 21 the input unit 17 the HMI unit 100) set by using the remote control 3 according to the search conditions set by using the remote control 3 and on the basis of the map data read from the map data storage unit 12. Route data showing the whole route which has been searched for by this route searching unit 130 are sent to the route guidance unit 140.

The route guidance unit 140 creates both drawing data for displaying a route guidance view on the screen of the monitor 2 and audio data for outputting a route guidance message via voice on the basis of the current position data sent thereto from the vehicle position detecting unit 90, the data showing the vehicle position mark sent thereto from the map matching unit 120, and the route data about the whole route which has been searched for by the route searching unit 130, and sends the drawing data and the audio data to the output unit 18.

The output unit 18 creates an image signal on the basis of the drawing data for drawing the map sent thereto from the map display unit 110 of the control unit 10, the drawing data for drawing the vehicle position mark and the whole route which are sent thereto from the route guidance unit 140, and the operation command sent thereto from the HMI unit 100, as mentioned above, and also creates an audio signal on the basis of the audio data sent thereto from the route guidance unit 140 of the control unit 10.

Figure 2:
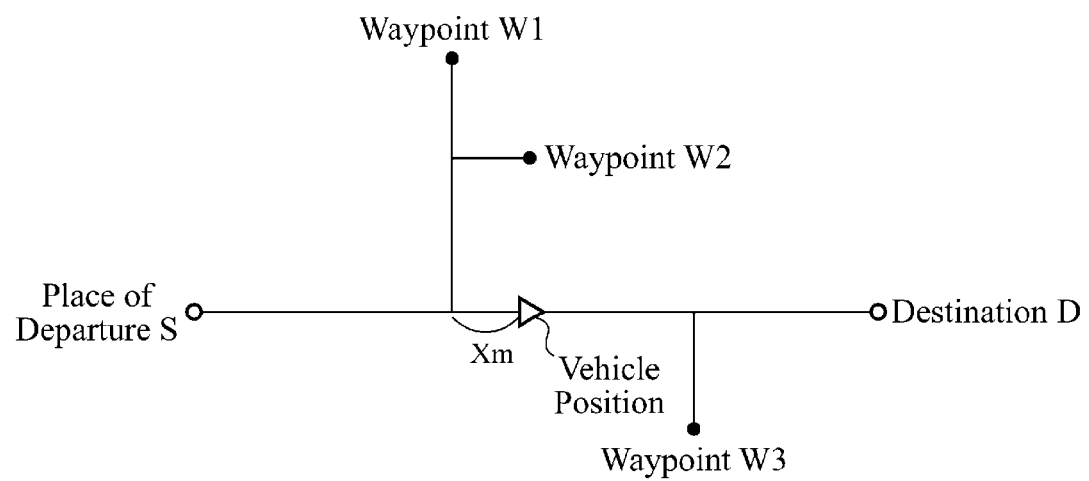
FIG. 2 is a view showing a brief description of the operation of the navigation device in accordance with Embodiment 1 of the present invention.

Next, the operation of the navigation device in accordance with Embodiment 1 of the present invention configured as mentioned above will be explained. This navigation device is configured in such a way as to, when the vehicle is traveling along a route leading from the place of departure S, via a waypoint W1, a waypoint W2, and a waypoint W3, to the destination D, and the vehicle has deviated from a route leading to the first next waypoint toward which the vehicle has been heading (abbreviated as the first next waypoint hereafter, and also expressed as the waypoint W1 hereafter) and has been at a predetermined distance of X meters (X is an arbitrary number) from the route, as shown in FIG. 2, re-search for either a route passing via (returning to) the first next waypoint (i.e., the waypoint W1) or a route not passing via the first next waypoint (i.e., the waypoint W1) according to the user's selection.

Figure 3:
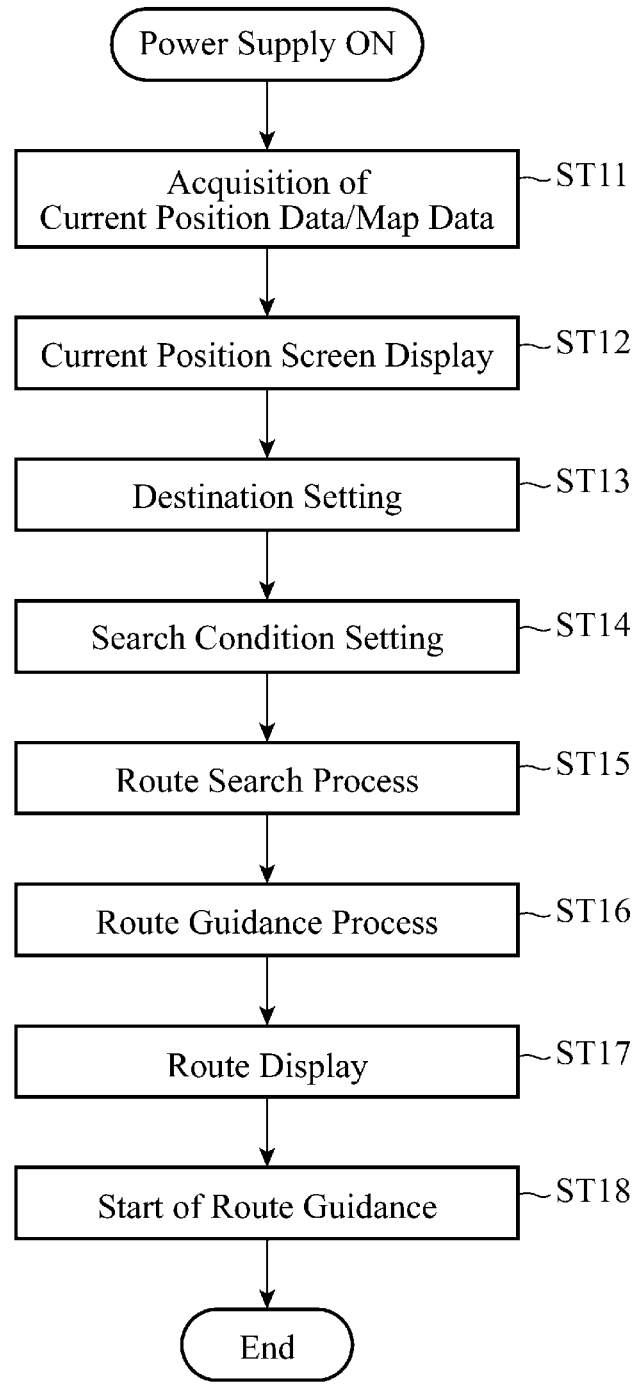
FIG. 3 is a flow chart showing a main process carried out by the navigation device in accordance with Embodiment 1 of the present invention.
Figure 4:
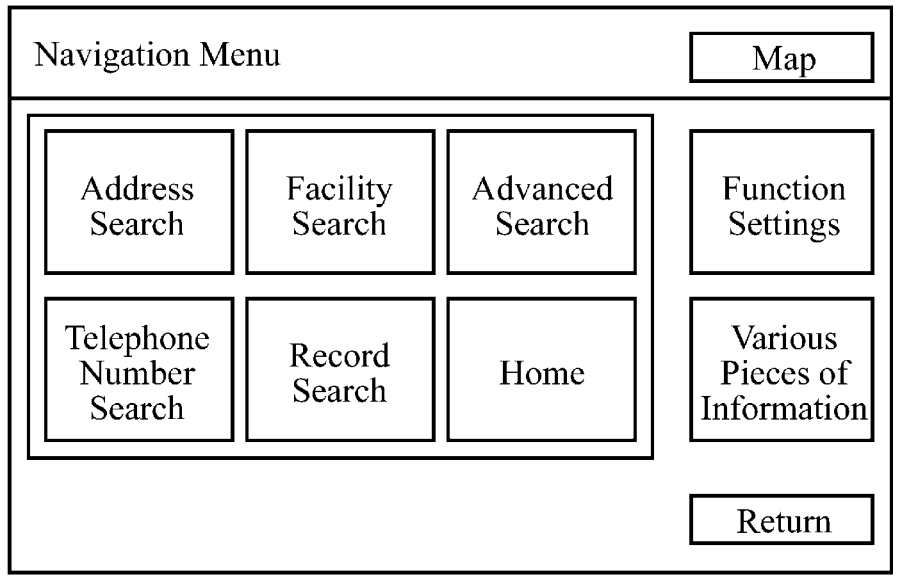
FIG. 4 is a view showing an example of a destination setting screen displayed in the navigation device in accordance with Embodiment 1 of the present invention.

First, a main process carried out by this navigation device will be explained with reference to both a flow chart shown in FIG. 3 and examples of the screen shown in FIGS. 4 and 5. In this main process, processes including a setting of the place of departure, the destination, and waypoints, a route search, start of route guidance are mainly carried out. Hereafter, the main process will be concretely explained.

In the main process, when the power supply is turned on, the current position data and map data are acquired first (step ST11). More specifically, the vehicle position detecting unit 90 sends either the current position of the vehicle which the vehicle position detecting unit has detected on the basis of the current position signal sent thereto from the GPS receiver 13, or the current position of the vehicle which the vehicle position detecting unit has detected by using both the speed signal sent thereto from the speed sensor 14 and the heading signal sent thereto from the gyro sensor 15 through dead reckoning to the map matching unit 120 as current position data. The disk drive unit 11 reads map data from the recording medium 11a set thereto, and stores the map data in the map data storage unit 12.

The map matching unit 120 which has received the current position data sent thereto from the vehicle position detecting unit 90 carries out a matching process of matching the vehicle position shown by the current position data with the map shown by the map data read from the map data storage unit 12. Through this matching process, the vehicle position mark is formed on the map. Data showing the vehicle position mark acquired through this matching process are sent to the route guidance unit 140.

A display of a current position screen is then produced (step ST12). More specifically, the map display unit 110 reads map data about an area surrounding the position shown by the current position data sent thereto from the vehicle position detecting unit 90 from the map data storage unit 12, creates drawing data for displaying the map on the screen of the monitor 2 on the basis of these read map data, and sends the drawing data to the output unit 18. The route guidance unit 140 creates drawing data for displaying the vehicle position mark on the screen of the monitor 2 on the basis of the data showing the vehicle position mark sent thereto from the map matching unit 120, and sends the drawing data to the output unit 18. The output unit 18 creates an image signal on the basis of the drawing data received from the map display unit 110 and the drawing data received from the route guidance unit 140, and sends the image signal to the monitor 2. The monitor 2 displays, as the current position screen, the map on which the vehicle position mark is superimposed, the map's center corresponding to the current position of the vehicle, on the basis of the image signal sent thereto from the output unit 18.

A setting of a destination is then performed (step ST13). More specifically, when the user performs an operation of commanding the navigation device to set a destination by using the remote control 3, the navigation device displays a destination setting screen as shown in FIG. 4 on the monitor 2. In this destination setting screen, a portion enclosed by a rectangle is a button, and the user is enabled to push down a desired button by using the remote control 3 to make the navigation device carry out a function allocated to the desired button. The same goes for each screen which will be explained hereafter.

The user sets the destination and a waypoint on the map currently displayed on the monitor 2 by using the remote control 3 to select address search, facility search, or telephone number search. In this case, the user can set a plurality of waypoints. Data showing the destination and the waypoints which are set by using the remote control 3 are sent to the route searching unit 130 via the input unit 17 and the HMI unit 100 of the navigation unit 1.

A setting of search conditions is then performed (step ST14). More specifically, after a setting of a destination in step ST13 is completed, the navigation device displays a search condition setting screen as shown in FIG. 5 on the monitor 2. The user then sets conditions for route search which are displayed on the monitor 2 by using the remote control 3. Concretely, the user sets a higher-priority search condition by pushing one of a button showing "fastest route", a button showing "shortest route", and a button showing "easy route", the buttons showing higher-priority conditions respectively. The user also sets whether the navigation device can use each of the following items: a highway, a toll road, a ferry, an avoidance route area, and a time-limited road by pushing down a "use" button or a "nonuse" button.

Figure 5:
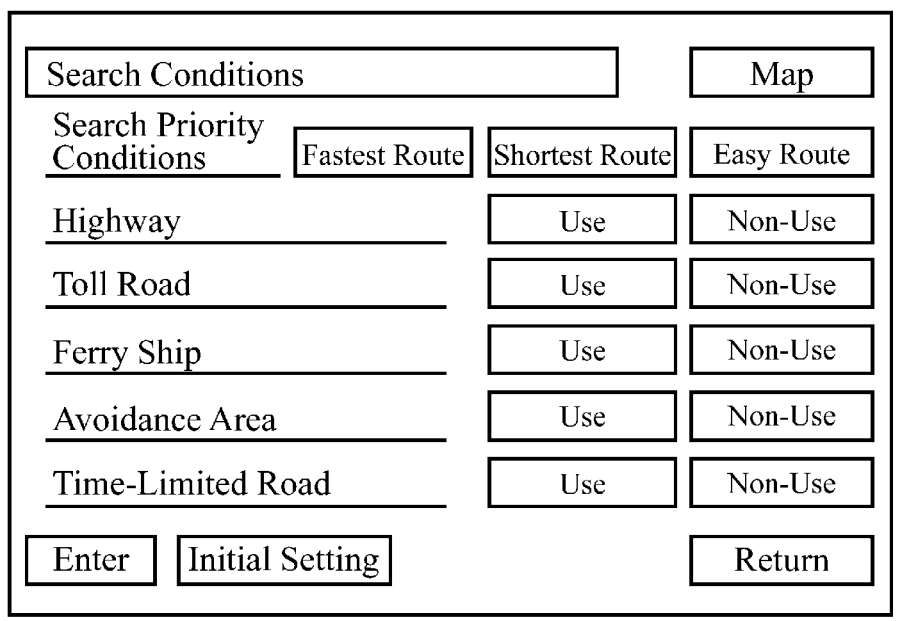
FIG. 5 is a view showing an example of a search condition setting screen displayed in the navigation device in accordance with Embodiment 1 of the present invention.

A "map" button in the search condition setting screen shown in FIG. 5 is used in order to return the screen of the monitor 2 to the current position screen, an "enter" button is used in order to make the settings permanent, an "initial setting" button is used in order to return the search conditions to initial ones, and a "return" button is used in order to return the screen of the monitor to the previous screen. When the "enter" button in this search condition setting screen is pushed down, data showing the set search conditions are sent to the route searching unit 130 via the input unit 17 and the HMI unit 100 of the navigation unit 1.

A route search process is then carried out (step ST15). More specifically, the route searching unit 130 searches for a whole route leading from the current position shown by the current position data received from the vehicle position detecting unit 90, via the waypoints set in step ST13, to the destination according to the search conditions set in step ST14. Route data showing the whole route which has been searched for by this route searching unit are sent to the route guidance unit 140.

A route guidance process is then carried out (step ST16). More specifically, the route guidance unit 140 creates both drawing data for displaying a route guidance view on the screen of the monitor 2 and audio data for outputting a route guidance message via voice on the basis of the current position data sent thereto from the vehicle position detecting unit 90, the data showing the vehicle position mark sent thereto from the map matching unit 120, and the route data sent thereto from the route searching unit 130, and sends the drawing data and the audio data to the output unit 18.

A route display screen is then produced (step ST17). More specifically, the output unit 18 creates an image signal on the basis of the drawing data for drawing the map sent thereto from the map display unit 110 of the control unit 10 and the drawing data for drawing the whole route and the vehicle position which are sent thereto from the route guidance unit 140. The image signal created by this output unit 18 is sent to the monitor 2. Accordingly, the guidance route and route guidance are displayed on the monitor 2. In this state, after the user checks that the route displayed on the monitor 2 is the one which the user has desired, he or she commands the navigation device to start guidance by pushing down a button (not shown) disposed on the screen of the monitor 2 or uttering a phrase.

Route guidance is then started (step ST18). More specifically, when the guidance start command is outputted in step ST17, the navigation device starts route guidance. More specifically, the output unit 18 creates an image signal on the basis of the drawing data for drawing the map sent thereto from the map display unit 110 of the control unit 10 and the drawing data for drawing the whole route and the vehicle position which are sent thereto from the route guidance unit 140, and also creates an audio signal on the basis of the audio data sent thereto from the route guidance unit 140 of the control unit 10. The image signal created by this output unit 18 is sent to the monitor 2. Accordingly, the guidance route and route guidance are displayed on the monitor 2. Furthermore, the audio signal created by the output unit 18 is sent to the audio speaker 4. Accordingly, the route guidance message is outputted from the audio speaker 4. After that, because the route guidance message corresponds to the environment which varies as the vehicle travels and is outputted in turn, the user can drive the vehicle according to the route guidance.

Figures 2, 6:
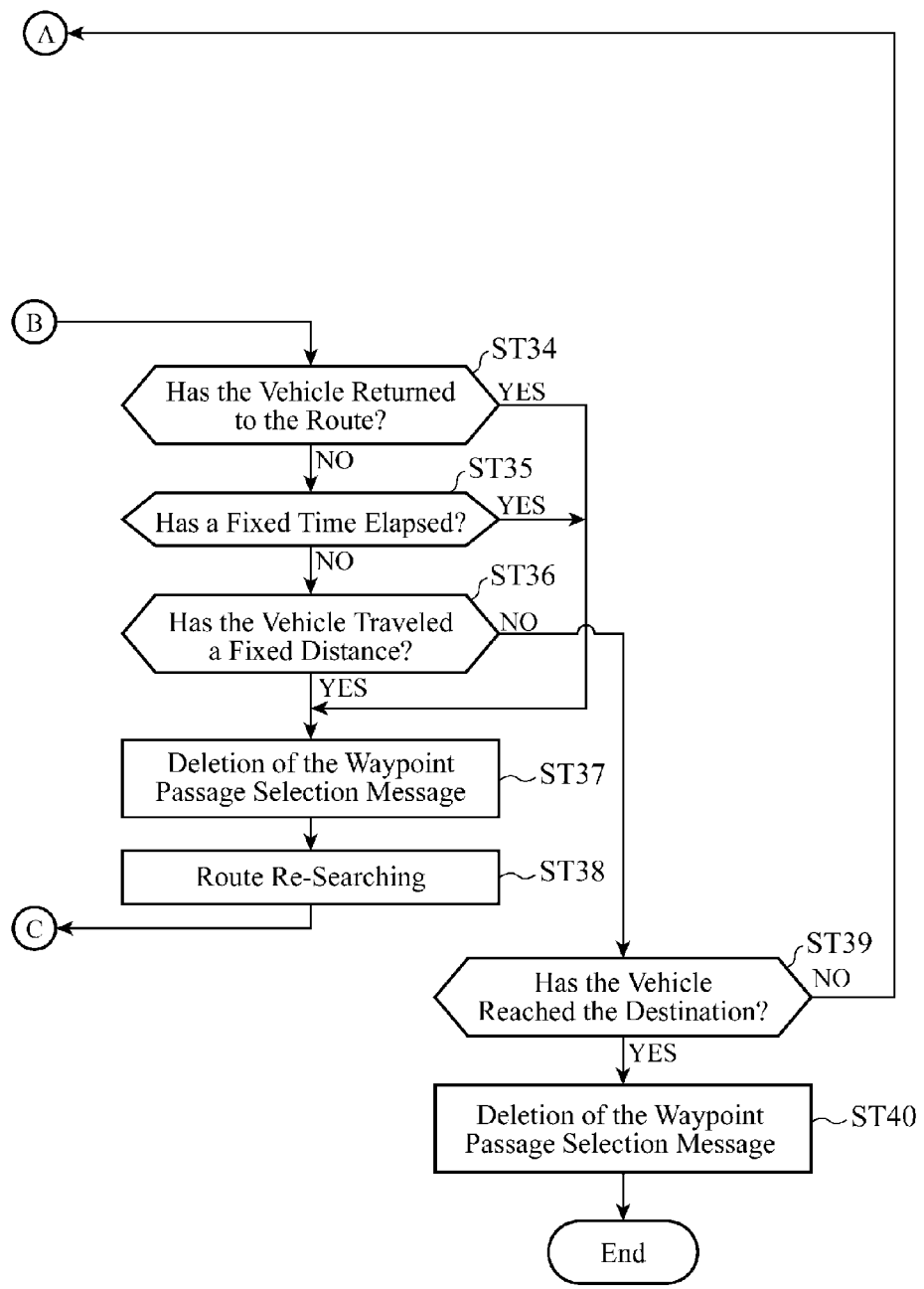

Next, the route guidance process which is carried out after the route guidance is started in the above-mentioned main process will be explained with reference to a flow chart shown in FIG. 6, focusing on a process in a case in which the vehicle has deviated from a route leading to a waypoint.

After the route guidance is started, the user travels along the route according to the route guidance. The navigation device carries out the route guidance process (step ST21). This route guidance process is the same as the process in the case of starting the route guidance in above-mentioned step ST18.

Whether the vehicle has deviated from a route leading to the first next waypoint toward which the vehicle has been heading to a distance of X meters or more is then checked to see (step ST22). More specifically, the route guidance unit 140 checks to see whether or not the position shown by the data sent from the map matching unit 120, the data indicating the vehicle position mark, has been at a distance of X meters or more from the route shown by the route data sent from the route searching unit 130. In this case, X can be an arbitrary value.

When the route guidance unit, in this step ST22, determines that the vehicle has not deviated from the route to a distance of X meters or more, the route guidance unit returns the sequence to step ST21 and continues the route guidance process. In contrast, when the route guidance unit, in this step ST22, determines that the vehicle has deviated from the route to a distance of X meters or more, the route guidance unit checks to see whether or not the position is on a route after the first next waypoint (step ST23). More specifically, the route guidance unit checks to see whether or not the position shown by the data sent from the map matching unit 120, the data indicating the vehicle position mark, is on the whole route shown by the route data sent from the route searching unit 130.

When it is determined, in this step ST23, that the position is not on the route after the first next waypoint, it is recognized that the vehicle has deviated from the route before the vehicle reaches the first next waypoint, and a route including the first next waypoint is re-searched for (step ST24). More specifically, the route searching unit 130 re-searches for a route leading from the current position shown by the current position data sent from the vehicle position detecting unit 90, via the first next waypoint, to the destination according to the already-set search conditions. Route data showing this route which has been re-searched for are sent to the route guidance unit 140. The route searching unit then returns the sequence to step ST21, and the navigation device continues the route guidance process.

Figure 7:
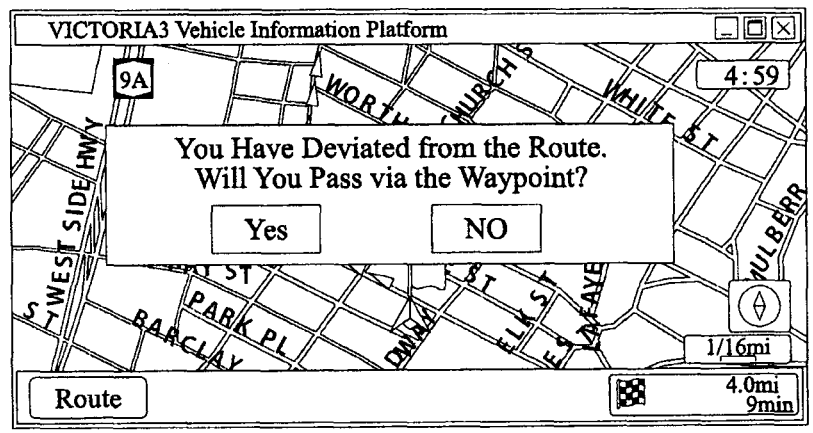
FIG. 7 is a view showing an example of a waypoint passage selection message displayed in the route guidance process carried out by the navigation device in accordance with Embodiment 1 of the present invention.

In contrast, when it is determined, in step ST23, that the position is on the route after the first next waypoint, a waypoint passage selection message is then outputted (step ST25). More specifically, the route guidance unit 140 creates drawing data showing the waypoint passage selection message and sends the drawing data to the output unit 18, and also creates audio data and sends this audio data to the output unit 18. As a result, the waypoint passage selection message including a "yes" button and a "no" button as shown in FIG. 7 is displayed on the monitor 2, while "You has deviated from the route. Will you pass via the waypoint?" is outputted from the audio speaker 4. The waypoint passage selection message corresponds to a "message" in accordance with the present invention.

Whether the vehicle has deviated from the route is then checked to see (step ST26). More specifically, the route guidance unit 140 checks to see whether or not the position shown by the data sent from the map matching unit 120, the data indicating the vehicle position mark, has been distant from the route shown by the route data sent from the route searching unit 130. When it is determined in this step ST26 that the vehicle has deviated from the route, the waypoint passage selection message is deleted (step ST27). More specifically, the route guidance unit 140 stops the process of sending the drawing data showing the waypoint passage selection message to the output unit 18. Accordingly, the waypoint passage selection message currently displayed on the monitor 2 is deleted. Then, the navigation device advances the sequence to step ST24, and re-searches for a route including the above-mentioned first next waypoint.

In contrast, when it is determined in step ST26 that the vehicle has not deviated from the route, whether or not the "yes" button has been pushed down is checked to see (step ST28). More specifically, the route guidance unit 140 checks to see whether or not data showing that the "yes" button is pushed down has been sent from the remote control 3 by way of the remote control light receiving unit 21, the input unit 17, and the HMI unit 100. When it is determined in this step ST28 that the "yes" button has been pushed down, the navigation device recognizes that the user has selected to pass via the first next waypoint, i.e., the waypoint toward which the user has been heading the next time, advances the sequence to step ST24, and re-searches for a route including the above-mentioned first next waypoint.

In contrast, when it is determined in step ST28 that the "yes" button has not been pushed down, whether or not the "no" button has been pushed down is then checked to see (step ST29). More specifically, the route guidance unit 140 checks to see whether or not data showing that the "no" button is pushed down has been sent from the remote control 3 by way of the remote control light receiving unit 21, the input unit 17, and the HMI unit 100.

When it is determined in this step ST29 that the "no" button has been pushed down, the navigation device recognizes that the user has selected not to pass via the first next waypoint, i.e., the waypoint toward which the user has been heading the next time, and automatically changes the waypoints (step ST30). More specifically, the route searching unit 130 compares the current position shown by the current position data sent from the vehicle position detecting unit 90 with the map shown by the map data acquired from the map data storage unit 12 to set other waypoints existing forward of the first next waypoint as new waypoints.

A route including the waypoints existing forward of the first next waypoint is then re-searched for (step ST31). More specifically, the route searching unit 130 re-searches for a route leading to the destination via the new waypoints set in step ST30 according to both the state of the vehicle, such as the position and traveling direction of the vehicle, and the already-set search conditions. Route data showing this route which has been re-searched for are sent to the route guidance unit 140. After that, the navigation device returns the sequence to step ST21 and continues the route guidance process.

The navigation device can be configured in such a way as to carry out processes of steps ST32 and ST33 instead of the processes of above-mentioned steps ST30 and ST31. The processes in this case will be explained hereafter. When it is determined in step ST29 that the "no" button has been pushed down, the navigation device recognizes that the user has selected not to pass via the first next waypoint, i.e., the waypoint toward which the user has been heading the next time, and changes the waypoint list (step ST32). More specifically, the route searching unit 130 sends the data showing all the waypoints set at the time to the route guidance unit 140. The route guidance unit 140 creates drawing data for displaying the waypoint list which is the list of the waypoints on the basis of the data showing the received waypoints, and sends the drawing data to the output unit 18. Accordingly, the waypoint list is displayed on the monitor 2. In this state, the user can select waypoints via which the user desires to pass by using the remote control 3, or delete waypoints via which the user does not desire to pass. Accordingly, new waypoints are set.

A route including the changed waypoints is then re-searched for (step ST33). More specifically, the route searching unit 130 re-searches for a route leading to the destination via the new waypoints set in step ST32 according to the already-set search conditions. Route data showing this route which has been re-searched for are sent to the route guidance unit 140. After that, the navigation device returns the sequence to step ST21 and continues the route guidance process.

When it is determined in above-mentioned step ST29 that the "no" button has not been pushed down, the navigation device recognizes that the user has neglected the selection operation, and then checks to see whether the vehicle has returned to the route (step ST34). More specifically, the route guidance unit 140 checks to see whether or not the position shown by the data sent from the map matching unit 120, the data indicating the vehicle position mark, is on the route shown by the route data sent from the route searching unit 130.

When it is determined in this step ST34 that the vehicle has not returned to the route, whether a fixed time has elapsed is then checked to see (step ST35). More specifically, the route guidance unit 140 refers to a not-shown timer to check to see whether a fixed time has elapsed after, in step ST22, determining that the vehicle has deviated from the route to a distance of X meters or more. When it is determined in this step ST35 that the fixed time has not elapsed, whether the vehicle has traveled a fixed distance is then checked to see (step ST36). More specifically, the route guidance unit 140 checks to see whether the position shown by the vehicle position data sent from the vehicle position detecting unit 90 has changed by a fixed distance after, in step ST22, determining that the vehicle has deviated from the route to a distance of X meters or more.

When it is determined in this step ST36 that the vehicle having traveled the fixed distance, when it is determined in above-mentioned step ST34 that the vehicle has returned to the route, and when it is determined in above-mentioned step ST35 that the fixed time has elapsed, the waypoint passage selection message is deleted (step ST37). The process of this step ST37 is the same as that of above-mentioned step ST27.

A route re-search is then carried out (step ST38). In this step ST38, whether to carry out a re-search for either a route leading via the first next waypoint or a route not leading via the first next waypoint can be predetermined in the navigation device or selected by the user. After that, the navigation device returns the sequence to step ST21 and continues the route guidance process.

When it is determined in above-mentioned step ST36 that the vehicle has not traveled the fixed distance, whether the vehicle has reached the destination is then checked to see (step ST39). More specifically, the route guidance unit 140 checks to see whether the position shown by the vehicle position data sent from the vehicle position detecting unit 90 matches the position set as the destination. When it is determined in this step ST39 that the vehicle has not reached the destination, the output returns to step ST26 and the above-mentioned process is repeated.

In contrast, when it is determined in step ST39 that the vehicle has reached the destination, the waypoint passage selection message is deleted (step ST40) The process of this step ST40 is the same as that of above-mentioned step ST27. Then, the route guidance process is ended.

As previously explained, the navigation device in accordance with Embodiment 1 of the present invention is configured in such a way as to, when determining that the vehicle has deviated from a route leading to the first next waypoint to a predetermined distance or more and is traveling along a route after the first next waypoint, output a waypoint passage selection message showing that the vehicle has deviated from the route, and issue a command indicating whether or not to pass via the first next waypoint in response to this waypoint passage selection message. Therefore, the navigation device enables the user to determine how to handle whether to pass via the first next waypoint according to the user's own will when the vehicle has deviated from the route. Therefore, the navigation device can provide enhanced user friendliness.

INDUSTRIAL APPLICABILITY

As mentioned above, the navigation device in accordance with the present invention is configured in such a way as to, when determining that the vehicle has deviated from a route leading to the first next waypoint to a predetermined distance or more and is traveling along a route after the first next waypoint, output a waypoint passage selection message showing that the vehicle has deviated from the route, and issue a command indicating whether or not to pass via the first next waypoint in response to this waypoint passage selection message. Therefore, the navigation device is suitable for use as a car navigation device which enables the user to determine how to handle whether to pass via the first next waypoint according to the user's own will when the vehicle has deviated from the route, and which carries out route guidance of a route including waypoints acquired through a route search, and the like.

The invention claimed is:

1. A navigation device comprising:
a setting unit configured to set waypoints and a destination;
a route searching unit configured to search for a whole route leading to the destination via the waypoints set by said setting unit;
a route guidance unit configured to carry out route guidance according to the whole route which is searched for by said route searching unit;
an output unit configured to output a message showing that a vehicle has deviated from a route leading to a first next waypoint toward which the vehicle has been heading when said route guidance unit determines that the vehicle has deviated from the route to a predetermined distance or more and is traveling along a route after said first next waypoint; and
an input unit configured to input a command indicating whether or not to travel via said first next waypoint in response to the message outputted by said output unit.

2. The navigation device according to claim 1, wherein when the command is inputted from the input unit, the output unit deletes the message which said output unit outputs and the route searching unit re-searches for a new whole route.

3. The navigation device according to claim 1, wherein when the command indicating that the vehicle does not travel via the first next waypoint is inputted, the output unit outputs a waypoint list in which a list of the waypoints set by the setting unit is shown, and the route searching unit re-searches for a new whole route according to a new waypoint list which is acquired by changing the waypoint list outputted by said output unit by using said input unit.

4. The navigation device according to claim 1, wherein when the command indicating that the vehicle does not travel via the first next waypoint is inputted, the route searching unit re-searches for a new whole route leading to the destination via another waypoint when the other waypoint exists forward of the first next waypoint, or re-searches for a new whole route leading to the destination when no other waypoint exists forward of the first next waypoint.

5. The navigation device according to claim 4, wherein the route searching unit checks a traveling direction of the vehicle and a section on the whole route in which the vehicle has entered, extracts waypoints via which the vehicle should travel except for waypoints existing backward of said section, and re-searches for a new waypoint leading to the destination via said extracted waypoints.

6. The navigation device according to claim 4, wherein when the vehicle continues to travel in a state in which the output unit outputs the message showing that the vehicle has deviated from the route leading to the first next waypoint, the route searching unit checks a traveling direction of the vehicle and a section on the whole route in which the vehicle has entered, extracts waypoints via which the vehicle should travel except for waypoints existing backward of said section, and re-searches for a new waypoint leading to the destination via said extracted waypoints.

7. The navigation device according to claim 1, wherein when the command indicating that the vehicle travels via the first next waypoint is inputted, the route searching unit re-searches for a new whole route leading to the destination via said first next waypoint.

8. The navigation device according to claim 1, wherein the output unit includes a display unit, and the input unit inputs the command according to either pushing down of a button displayed on a screen of said display unit, or voice.

9. The navigation device according to claim 1, wherein when the command is not inputted from the input unit even if a predetermined period of time has elapsed after the output unit outputs the message showing that the vehicle has deviated from the route, the output unit deletes the message which said output unit outputs and the route searching unit re-searches for a new whole route.

10. The navigation device according to claim 1, wherein when the route guidance unit determines that the vehicle has deviated from the route to the predetermined distance or more in a state in which the output unit outputs the message showing that the vehicle has deviated from the route, the output unit deletes the message which said output unit outputs and the route searching unit re-searches for a new whole route.

11. The navigation device according to claim 9, wherein the route searching unit re-searches for a new whole route leading to the destination via the first next waypoint.

12. The navigation device according to claim 10, wherein the route searching unit re-searches for a new whole route leading to the destination via the first next waypoint.

13. The navigation device according to claim 9, wherein the route searching unit re-searches for a new whole route leading to the destination via another waypoint when the other waypoint exists forward of the first next waypoint, or re-searches for a new whole route leading to the destination when no other waypoint exists forward of the first next waypoint.

14. The navigation device according to claim 10, wherein the route searching unit re-searches for a new whole route leading to the destination via another waypoint when the other waypoint exists forward of the first next waypoint, or re-searches for a new whole route leading to the destination when no other waypoint exists forward of the first next waypoint.

15. The navigation device according to claim 1, wherein when the route guidance unit determines that the vehicle has returned to the route leading to the first next waypoint in a state in which the output unit outputs the message showing that the vehicle has deviated from the route, the output unit deletes the message which said output unit outputs.

16. The navigation device according to claim 1, wherein when the command is not inputted from the input unit even if a predetermined period of time has elapsed after the output unit outputs the message showing that the vehicle has deviated from the route, the output unit deletes the message which said output unit outputs and the route searching unit re-searches for a new whole route leading to the destination via the first next waypoint, a new whole route leading to the destination via another waypoint when the other waypoint exists forward of said first next waypoint, or a new whole route leading to the destination when no other waypoint exists forward of said first next waypoint.

17. The navigation device according to claim 1, wherein when the command is not inputted from the input unit even if the vehicle travels a fixed distance after the output unit outputs the message showing that the vehicle has deviated from the route, the output unit deletes the message which said output unit outputs and the route searching unit re-searches for a new whole route leading to the destination via the first next waypoint, a new whole route leading to the destination via another waypoint when the other waypoint exists forward of said first next waypoint, or a new whole route leading to the destination when no other waypoint exists forward of said first next waypoint.

18. The navigation device according to claim 1, wherein when the route guidance unit determines that the vehicle has reached the destination, the output unit deletes the message which said output unit outputs.

19. A navigation method performed by utilizing a navigation apparatus, comprising:
  setting, by utilizing a setting unit of the navigation apparatus, waypoints and a destination;
  searching, by utilizing a route searching unit of the navigation apparatus, for a whole route leading to the destination via the waypoints set by said setting step;
  carrying out, by utilizing a route guidance unit of the navigation apparatus, route guidance according to the whole route which is searched for by said route searching step;
  outputting, by utilizing an output unit of the navigation apparatus, a message showing that a vehicle has deviated from a route leading to a first next waypoint toward which the vehicle has been heading when, by said route guidance step, it is determined that the vehicle has deviated from the route to a predetermined distance or more and is traveling along a route after said first next waypoint; and
  inputting, by utilizing an input unit of the navigation apparatus, a command indicating whether or not to travel via said first next waypoint in response to the outputted message.

* * * * *